(12) United States Patent
Ferreira da Silva et al.

(10) Patent No.: US 12,402,622 B2
(45) Date of Patent: *Sep. 2, 2025

(54) AGRICULTURAL COMPOSITIONS AND METHODS OF USE THEREOF

(71) Applicant: Valent U.S.A. LLC, San Ramon, CA (US)

(72) Inventors: Eduardo Chagas Ferreira da Silva, Savoy, IL (US); John Andrew Pawlak, Lansing, MI (US)

(73) Assignee: VALENT U.S.A., LLC, San Ramon, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/645,906

(22) Filed: Apr. 25, 2024

(65) Prior Publication Data
US 2024/0268378 A1  Aug. 15, 2024

Related U.S. Application Data

(63) Continuation of application No. 17/972,678, filed on Oct. 25, 2022, now Pat. No. 11,998,004, which is a continuation of application No. 17/123,573, filed on Dec. 16, 2020, now Pat. No. 11,690,375.

(60) Provisional application No. 62/949,625, filed on Dec. 18, 2019.

(51) Int. Cl.
*A01N 25/22* (2006.01)
*A01N 37/40* (2006.01)
*A01N 43/54* (2006.01)

(52) U.S. Cl.
CPC .......... *A01N 25/22* (2013.01); *A01N 37/40* (2013.01); *A01N 43/54* (2013.01)

(58) Field of Classification Search
None
See application file for complete search history.

(56) References Cited

U.S. PATENT DOCUMENTS

| | | | |
|---|---|---|---|
| 2018/0255772 A1* | 9/2018 | Flemmens | A01P 13/00 |
| 2019/0014786 A1* | 1/2019 | Greenshields | A01N 63/36 |
| 2019/0014787 A1* | 1/2019 | Greenshields | C12N 1/14 |
| 2020/0323198 A1* | 10/2020 | Clary | A01N 25/04 |
| 2021/0186012 A1* | 6/2021 | Ferreira d Silva | A01N 25/22 |

FOREIGN PATENT DOCUMENTS

WO  WO-2017210166 A1 * 12/2017  ............... A01C 1/06

* cited by examiner

*Primary Examiner* — Alton N Pryor
(74) *Attorney, Agent, or Firm* — Wood, Phillips, Katz, Clark & Mortimer

(57) ABSTRACT

The present invention is directed to an agricultural composition comprising a protoporphyrinogen oxidase (PPO) inhibitor, one or more sugar alcohols and optionally, one or more auxin herbicides. The present invention is further directed to a method of controlling weeds comprising applying concurrently or sequentially a PPO inhibitor and one or more sugar alcohols, and optionally one or more auxin herbicides to the weeds or an area in need of weed control.

19 Claims, 1 Drawing Sheet
(1 of 1 Drawing Sheet(s) Filed in Color)

A.
B.
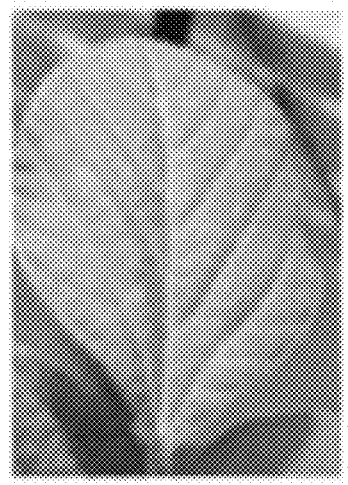
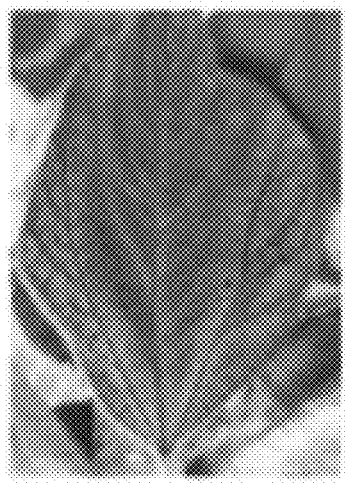
C.
D.
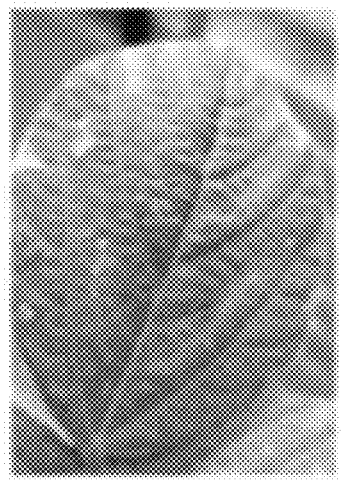
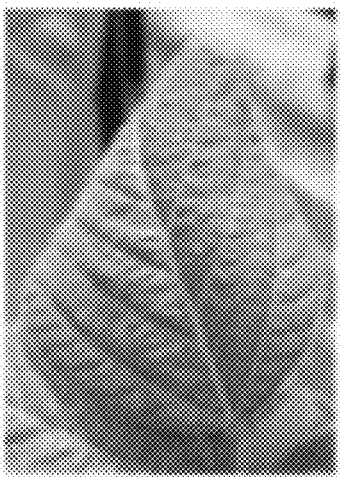
E.
F.

AGRICULTURAL COMPOSITIONS AND METHODS OF USE THEREOF

FIELD OF THE INVENTION

The present invention relates to an agricultural composition comprising a protoporphyrinogen oxidase (PPO) inhibitor, one or more sugar alcohols and optionally, one or more auxin herbicides. The present invention further relates to a method of controlling weeds comprising applying concurrently or sequentially a PPO inhibitor and one or more sugar alcohols, and optionally one or more auxin herbicides to the weeds or an area in need of weed control.

BACKGROUND OF THE INVENTION

Unwanted plants, such as weeds, reduce the amount of resources available to crop plants and can have a negative effect on crop plant yield and quality. For example, a weed infestation reportedly was responsible for an 80% reduction in soybean yields. Bruce, J. A., and J. J. Kells, Horseweed (*Conyza Canadensis*) control in no-tillage soybeans (*Glycine max*) with preplant and preemergence herbicides, Weed Technol, 1990, 4, 642-647. Unwanted plants in crop plant environments include broadleaves, grasses and sedges. To save time, money and resources grass herbicides are often mixed with broadleaf herbicides to control a range of weeds. Further, to combat herbicide resistance multiple herbicides having different modes of action may be applied together.

As mentioned above, one way to control multiple weeds is to apply multiple herbicides sequentially or concurrently. However, when applying multiple herbicides, care must be taken to ensure that each of the herbicides are stable in their composition and effective when combined in either a formulation, a tank mix or after application.

Protoporphyrinogen oxidase ("PPO") inhibitors are herbicides that primarily control broadleaf weeds. PPO inhibitors create highly toxic molecules upon contact with the weed that result in destruction of plant tissue. PPO inhibitors are also effective against some grasses.

Auxin herbicides primarily control broadleaf weeds. Auxin herbicides are plant growth regulators that mimic auxin and result in uncontrolled growth and death. These herbicides have been used successfully for over 60 years to control broadleaf weeds in cereal crops. Auxin herbicides are not effective against grasses.

Accordingly, there is a need in the art for a composition containing PPO inhibitors that is effective when combined with auxin herbicides to save time, money and resources. This composition should be stable and effective upon application.

SUMMARY OF THE INVENTION

The present invention is directed to an agricultural composition comprising a protoporphyrinogen oxidase ("PPO") inhibitor, one or more sugar alcohols and optionally, one or more auxin herbicides.

The present invention is further directed to a method of controlling weeds comprising applying concurrently or sequentially a PPO inhibitor and one or more sugar alcohols, and optionally one or more auxin herbicides to the weeds or an area in need of weed control.

BRIEF DESCRIPTION OF THE DRAWINGS

The patent or application file contains at least one drawing executed in color. Copies of this patent or patent application publication with color drawing(s) will be provided by the Patent and Trademark Office upon request and payment of the necessary fee.

FIG. 1. Soybean plant leaf at V6 stage. A. untreated control. B. Treated with 20 g/HA S-3100. C. Treated with 6800 g/HA mannitol. D. Treated with 6800 g/HA sorbitol. E. Treated with 20 g/HA S-3100 and 6800 g/HA mannitol. F. Treated with 20 g/HA S-3100 and 6800 g/HA sorbitol.

DETAILED DESCRIPTION OF THE INVENTION

The Applicant has unexpectedly discovered that the addition of one or more sugar alcohols to agricultural compositions containing a protoporphyrinogen oxidase inhibitor ("PPO inhibitor") provides stable composition and effective application when combined with auxin herbicides.

In one embodiment, the present invention is directed to an agricultural composition comprising a PPO inhibitor and one or more sugar alcohols.

As used herein the term "protoporphyrinogen oxidase inhibitor" or "PPO inhibitors" refers, but is not limited to, any compound capable of inhibiting the oxidation of protoporphyrinogen through interaction with the protoporphyrinogen oxidase enzyme, including those compounds not yet discovered or synthesized. Current PPO inhibitors include, but are not limited to, diphenylethers such as acifluorfen-sodium, bifenox, chlornitrofen, chlomethoxyfen, ethyoxyfen-ethyl, fluoroglycofen-ethyl, fomesafen, lactofen and oxyfluorfen, N-phenylphthalimides such as cinidon-ethyl, flumiclorac and flumioxazin, oxadiazoles such as oxadiargyl and oxadiazon, oxazolidinediones such as pentoxazone, phenylpyrazoles such as fluazolate and pyraflufen-ethyl, pyrimidindiones such as benzfendizone, butafenacil and saflufenacil, thiadiazoles such as fluthiacet-methyl and thidiazimin, triazolinones such as azafenidin, carfentrazone-ethyl and sulfentrazone and others such as flufenpyr-ethyl, profluazol and pyraclonil.

In a preferred embodiment the PPO inhibitor is selected from the group consisting of is selected from the group consisting of ethyl [3-[2-chloro-4-fluoro-5-(1-methyl-6-trifluoromethyl-2,4-dioxo-1,2,3,4-tetrahydropyrimidin-3-yl)phenoxy]-2-pyridyloxy]acetate, flumioxazin, lactofen, fomesafen, saflufenacil, sulfentrazone and trifludimoxazin. In a more preferred embodiment, the PPO inhibitor is ethyl [3-[2-chloro-4-fluoro-5-(1-methyl-6-trifluoromethyl-2,4-dioxo-1,2,3,4-tetrahydropyrimidin-3-yl)phenoxy]-2-pyridyloxy]acetate.

In another preferred embodiment, the PPO inhibitor may be present in compositions of the present invention at a concentration from about 0.1% to about 99.9% w/v, more preferably from about 1% to about 99% w/v.

In another preferred embodiment, the one or more sugar alcohols is selected from the group consisting of D-mannitol, D-sorbitol, maltitol, erythritol, L-arabitol, xylitol, ID-chiro-inositol, inositol, myoinositol, galactinol, L-quebrachitol, D-pinitol, D-ononitol, D-myo-inositol-1,3-diphosphate and galactinol. In a more preferred embodiment, the one or more sugar alcohols is D-sorbitol.

In another preferred embodiment, the one or more sugar alcohols may be present in compositions of the present invention at a concentration from about 0.1% to about 99.9% w/v, more preferably from about 1% to about 99% w/v.

In another embodiment, the compositions of the present invention further comprise one or more auxin herbicides.

In a preferred embodiment, the one or more auxins is selected from the group consisting of dicamba, 2,4-D, dichloroprop, (4-chloro-2-methylphenoxy)acetic acid (MCPA), 4-(4-chloro-2 methylphenoxy)butanoic acid (MCPB), mecoprop, picloram, quinclorac, triclopyr, fluroxypyr, picloram, aminopyralid, clopyralid and aminocyclopyrachlor and agricultural acceptable salts and esters thereof. In a more preferred embodiment, the one or more auxins is a salt of dicamba. In an even more preferred embodiment, the salt of dicamba is selected from the group consisting of dicamba-biproamine, dicamba-diglycolamine, and dicamba-tetrabutylamine.

In another preferred embodiment, the one or more auxins may be present in compositions of the present invention at a concentration from about 0.1% to about 99.9% w/v, more preferably from about 1% to about 99% w/v.

The compositions of the present invention may further comprise one or more excipients selected from the group consisting of solvents, anti-caking agents, stabilizers, anti-foaming agents, slip agents, humectants, dispersants, wetting agents, thickening agents, emulsifiers, anti-freeze agents and preservatives. Other components that enhance the biological activity of these ingredients may optionally be included.

The compositions of the present invention can be applied by any convenient means. Those skilled in the art are familiar with the modes of application that include foliar applications such as spraying, chemigation (a process of applying the mixture through the irrigation system), by granular application, or by impregnating the mixture on fertilizer.

The compositions of the present invention can be prepared as concentrate formulations, as ready-to-use formulations or as a tank mix.

In another embodiment, the present invention is further directed to a method of controlling weeds comprising applying concurrently or sequentially a PPO inhibitor and one or more sugar alcohols and optionally, one or more auxin herbicides to the weeds or an area in need of weed control.

In a preferred embodiment, the PPO inhibitor may be applied at a rate from about 1 to about 1,000 grams per hectare ("g/HA"), more preferably from about 1 to about 100 g/HA and even more preferably from about 10 to about 50 g/HA and yet even more preferably from about 10 to about 30 g/HA and most preferably at about 20 g/HA.

In another preferred embodiment, the one or more sugar alcohols may be applied at a rate from about 100 to about 100,000 g/HA, more preferably from about 1,000 to about 30,000 g/HA and even more preferably from about 1,700 to about 27,200 g/HA and yet even more preferably at about 1,700, about 3,400, about 6,800, about 13,600 and about 27,200 g/HA and most preferably at about 6,800 g/HA.

In another preferred embodiment, the one or more auxin herbicides may be applied at a rate from about 1 to about 1,000 g/HA, more preferably from about 10 to about 100 g/HA.

In another embodiment, the weed controlled by the compositions of the present invention is at least one of Waterhemp (*Amaranthus tuberculatus*), Horseweed (*Conyza Canadensis*), Ivyleaf Morningglory (*Ipomoea hederacea*), Pitted Morningglory (*Ipomoea lacunose*), Common Ragweed (*Ambrosia artemisiifolia*), Giant Ragweed (*Ambrosia trifida*), Large Crabgrass (*Digitaria sanguinalis*), Palmer Amaranth (*Amaranthus palmeri*), Broadleaf Signalgrass (*Brachiaria platyhylla*), Common Barnyardgrass (*Echinochloa crus-galli*), Yellow Nutsedge (*Cyperus esculentus*), Eclipta (*Eclipta prostrate*), Lambsquarters (*Chenopodium species*), Velvetleaf (*Abutilon theophrasti*), Foxtail (*Setaria species*), Giant Foxtail (*Setaria faberi*) and annual grasses. As used herein, annual grasses include corn, sorghums, wheat, rye, barley, and oats.

In another embodiment, the area in need of weed control may include any area that is desired to have a reduced number of weeds or to be free of weeds. For example, compositions of the present invention may be applied to an area used to grow crop plants, such as a field orchard, or vineyard. Mixtures of the present invention can also be applied to non-agricultural areas in need of weed control such as lawns, golf courses, or parks.

As used herein, all numerical values relating to amounts, weight percentages and the like are defined as "about" or "approximately" each particular value, plus or minus 10%. For example, the phrase "at least 5.0% by weight" is to be understood as "at least 4.5% to 5.5% by weight." Therefore, amounts within 10% of the claimed values are encompassed by the scope of the claims.

Throughout the application, the singular forms "a," "an," and "the" include plural reference unless the context clearly dictates otherwise.

These representative embodiments are in no way limiting and are described solely to illustrate some aspects of the invention.

Further, the following examples are offered by way of illustration only and not by way of limitation.

EXAMPLES

Agridex® is a crop oil concentrate and is a registered trademark of and available from Bayer CropScience.

Induce® is an alkyl aryl polyoxylkane ethers and free fatty acids and is a registered trademark of and available from Helena Chemical Company.

Example 1—Mannitol and Sorbitol Increase Performance of S-3100 in Barnyard Grass 4 trials were conducted on the efficacy of ethyl [3-[2-chloro-4-fluoro-5-(1-methyl-6-trifluoromethyl-2,4-dioxo-1, 2,3,4-tetrahydropyrimidin-3-yl)phenoxy]-2-pyridyloxy]acetate ("S-3100") with or without mannitol or sorbitol. Specifically, 4 plots of barnyard grass were grown to 6 inches in height. These plots were placed in a spray chamber for treatment. All compositions contained 1% v/v of Agridex® and 0.25% v/v of Induce®. Treatments and results can be found in Table 1, below.

TABLE 1

| Treatment | Application Rate (Grams per Hectare) | Days After Treatment (% control) | | | |
|---|---|---|---|---|---|
| | | 2 | 7 | 13 | 20 |
| Untreated Control | 0 | 0 | 0 | 0 | 0 |
| S-3100 | 20 | 27.2 | 72.1 | 49.3 | 40 |
| S-3100 Mannitol | 20 6800 | 26.4 | 82.9 | 74.3 | 60 |
| S-3100 Sorbitol | 20 6800 | 32.9 | 84.3 | 62.9 | 55 |

As seen in Table 1, above, at 2 days after treatment ("DAT") there was a 5% increase in control of barnyard grass by S-3100 and sorbitol (32.9%) compared to S-3100 alone (27.2%). At 7 DAT, both S-3100 and mannitol (82.9%) and S-3100 and sorbitol (84.3%) demonstrated more than a 10% increase in control of barnyard grass compared to S-3100 treatment alone (72.1%).

Improved residual control was also observed at 13 DAT and at 20 DAT. At 13 DAT, S-3100 and mannitol (74.3%) demonstrated a nearly 25% increase in control of barnyard grass compared to S-3100 alone (49.3%). S3100 and sorbitol (62.9%) demonstrated a nearly 13% increase in control of barnyard grass compared to S-3100 alone. Furthermore, at 20 DAT, S-3100 and mannitol maintained its improved efficacy showing 60% control of barnyard grass compared to only 40% control by S-3100 alone. S-3100 and sorbitol also showed an increased control of barnyard grass at 20 DAT (55%) compared to S-3100 alone. Increased activity was observed as increased speed of contract burn, more complete kill and less regrowth of barnyard grass plants.

Example 2—Mannitol and Sorbitol Increase Performance of S-3100 in Corn 4 trials were conducted on the efficacy of S-3100 with or without mannitol or sorbitol. Specifically, 4 plots of corn were grown to 12 inches in height. These plots were placed in a spray chamber for treatment. All compositions contained 1% v/v of Agridex® and 0.25% v/v of Induce®. Treatments and results can be found in Table 2, below.

TABLE 2

| Treatment | Application Rate (Grams per Hectare) | Days After Treatment (% control) | | |
|---|---|---|---|---|
| | | 9 | 13 | 22 |
| Untreated Control | 0 | 0 | 0 | 0 |
| S-3100 | 20 | 55.8 | 52.5 | 25 |
| S-3100 Mannitol | 20 6800 | 56.7 | 63.2 | 55 |
| S-3100 Sorbitol | 20 6800 | 65.2 | 82.3 | 62.3 |

As seen in Table 2, above, at 9 DAT there was a nearly 10% increase in control of corn by S-3100 and sorbitol (65.2%) compared to S-3100 alone (55.8%). At 13 DAT, both S-3100 and mannitol (63.2%) and S-3100 and sorbitol (82.3%) demonstrated more than a 10% and nearly ad 30% increase in control of corn compared to S-3100 treatment alone (52.5%), respectively.

Improved control was also observed at 22 DAT. At 20 DAT, S-3100 and mannitol (55%) demonstrated a 30% increase in control of corn compared to S-3100 alone (25%). S3100 and sorbitol (62.3%) demonstrated a nearly 37% increase in control of corn compared to S-3100 alone. Increased activity was observed as increased speed of contract burn, more complete kill and less regrowth of corn plants.

Example 3—Mannitol and Sorbitol Increase Performance of S-3100 in Crabgrass 12 trials were conducted on the efficacy of S-3100 with or without mannitol or sorbitol at various application rates. Specifically, 12 plots of crabgrass were grown to 10 inches in height. These plots were placed in a spray chamber for treatment. All compositions contained 1% v/v of Agridex® and 0.25% v/v of Induce®. Treatments and results can be found in Table 3, below.

TABLE 3

| Treatment | Application Rate (Grams per Hectare) | Days After Treatment (% control) | |
|---|---|---|---|
| | | 7 | 14 |
| Untreated Control | 0 | 0 | 0 |
| S-3100 | 20 | 81.3 | 76.9 |
| S-3100 Mannitol | 20 1700 | 82.5 | 76.5 |
| S-3100 Mannitol | 20 3400 | 85.6 | 80.6 |
| S-3100 Mannitol | 20 6800 | 87.5 | 82.5 |
| S-3100 Mannitol | 20 13600 | 85 | 87.1 |
| S-3100 Mannitol | 20 27200 | 87.1 | 83.4 |
| S-3100 Sorbitol | 20 1700 | 90.3 | 85 |
| S-3100 Sorbitol | 20 3400 | 88.8 | 83.8 |
| S-3100 Sorbitol | 20 6800 | 89.9 | 86.8 |
| S-3100 Sorbitol | 20 13600 | 90.5 | 85.6 |
| S-3100 Sorbitol | 20 27200 | 95.1 | 88.8 |

Both mannitol ($R^2=0.8102$) and sorbitol ($R^2=0.7788$) showed high relationship between doses and % control at 7 DAT, which continued at 14 DAT for each of mannitol ($R^2=0.7905$) and sorbitol ($R^2=0.8325$). As seen in Table 3, above, at both 7 and 14 DAT each of mannitol and sorbitol at 1700, 3400, 6800, 13600 and 27200 g/HA showed increase control of crabgrass over S-3100 alone.

Example 4—Mannitol and Sorbitol Increase Performance of S-3100 in Volunteer Corn 12 trials were conducted on the efficacy of S-3100 with or without mannitol or sorbitol at various application rates. Specifically, 12 plots of volunteer corn were grown to 14 inches in height. These plots were placed in a spray chamber for treatment. All compositions contained 1% v/v of Agridex® and 0.25% v/v of Induce®. Treatments and results can be found in Table 4, below.

TABLE 4

| Treatment | Application Rate (Grams per Hectare) | Days After Treatment | |
|---|---|---|---|
| | | 7 (% control) | 8 (% lodging) |
| Untreated Control | 0 | 0 | 0 |
| S-3100 | 20 | 80.6 | 75 |
| S-3100 Mannitol | 20 1700 | 82.5 | 75 |
| S-3100 Mannitol | 20 3400 | 80.9 | 62.5 |
| S-3100 Mannitol | 20 6800 | 81.3 | 50 |
| S-3100 Mannitol | 20 13600 | 82.5 | 37.5 |
| S-3100 Mannitol | 20 27200 | 81.9 | 37.5 |
| S-3100 Sorbitol | 20 1700 | 88.6 | 62.5 |
| S-3100 Sorbitol | 20 3400 | 86.3 | 100 |
| S-3100 | 20 | 90.0 | 100 |

TABLE 4-continued

| | | Days After Treatment | |
|---|---|---|---|
| Treatment | Application Rate (Grams per Hectare) | 7 (% control) | 8 (% lodging) |
| Sorbitol | 6800 | | |
| S-3100 | 20 | 92.9 | 100 |
| Sorbitol | 13600 | | |
| S-3100 | 20 | 92.1 | 100 |
| Sorbitol | 27200 | | |

Sorbitol ($R^2$=0.8513) showed high relationship between doses and % control at 7 DAT that was not observed with mannitol ($R^2$=0.22). However, as seen in Table 4, above, both sorbitol and mannitol at 1700, 3400, 6800, 13600 and 27200 g/HA showed increase control of volunteer corn over S-3100 alone.

Further, as seen in Table 4, above, mannitol did not have an effect on lodging as the addition of mannitol to S-3100 did not increase lodging. However, the addition of sorbitol resulted in 100% lodging.

Example 5—Mannitol and Sorbitol Increase Performance of S-3100 in Crabgrass 12 trials were conducted on the efficacy of S-3100 with or without mannitol or sorbitol at various application rates. Specifically, 12 plots of barnyard grass were grown to 10 inches in height. These plots were placed in a spray chamber for treatment. All compositions contained 1% v/v of Agridex® and 0.25% v/v of Induce®. Treatments and results can be found in Table 5, below.

TABLE 5

| | | Days After Treatment (% control) | |
|---|---|---|---|
| Treatment | Application Rate (Grams per Hectare) | 7 | 14 |
| Untreated Control | 0 | 0 | 0 |
| S-3100 | 20 | 94.1 | 89.1 |
| S-3100 Mannitol | 20 1700 | 93.8 | 91.1 |
| S-3100 Mannitol | 20 3400 | 98.5 | 96.6 |
| S-3100 Mannitol | 20 6800 | 97.1 | 94.9 |
| S-3100 Mannitol | 20 13600 | 97.4 | 94.3 |
| S-3100 Mannitol | 20 27200 | 94.6 | 93 |
| S-3100 Sorbitol | 20 1700 | 94.6 | 91.8 |
| S-3100 Sorbitol | 20 3400 | 97 | 99 |
| S-3100 Sorbitol | 20 6800 | 98.3 | 96.6 |
| S-3100 Sorbitol | 20 13600 | 92.6 | 92 |
| S-3100 Sorbitol | 20 27200 | 99 | 99 |

Neither mannitol or sorbitol showed high relationship between doses and % control at 7 DAT (mannitol $R^2$=0.825; sorbitol $R^2$=0.4663) or 14 DAT (mannitol $R^2$=0.6646; sorbitol $R^2$=0.4192). As seen in Table 5, above, at both 7 and 14 DAT each of mannitol and sorbitol at 1700, 3400, 6800, 13600 and 27200 g/HA showed increase control of barnyard grass over S-3100 alone.

Example 6—Mannitol and Sorbitol Increase Translocation of S-3100

4 plots of soybeans were grown to the V6 stage. Soybean petioles of plants at the V6 stage were treated in a petiole detached assay with 1 of the following 4 treatments: 1) untreated; 2) 20 g/HA S-3100; 3) 20 g/HA S-3100 and 6800 g/HA mannitol or 4) 20 g/HA S-3100 and 6800 g/HA sorbitol. Results were recorded 21 DAT. Results can be seen in FIG. 1.

As seen in FIG. 1, Plants treated with mannitol, but not sorbitol, alone showed necrotic areas on the leaf tissue at 21 DAT. Petioles treated with S-3100 alone showed leaf yellowing and vein necrosis especially on the main vascular tissue. This pattern suggest that S-3100 could be partially translocated upwards through the vascular tissue. Petioles treated with S-3100 and mannitol showed intense vein necrosis, which suggest that mannitol could aid the S-3100 translocation to the smaller veins of the soybean leaves. S-3100 and sorbitol showed intense leaf bronzing and only mild vein necrosis on some leaves. The leaf bronzing was more intense on the adaxial side of the leaves. Quantification of S-3100 and its breakdowns on the leaves were not performed.

The invention claimed is:

1. An agricultural composition comprising a protoporphyrinogen oxidase (PPO) inhibitor and one or more sugar alcohols, wherein presence of the one or more sugar alcohols in the composition improves weed control by the PPO inhibitor by at least 10% over the PPO inhibitor alone, wherein the one or more sugar alcohols is selected from the group consisting of D-mannitol, D-sorbitol, maltitol, erythritol, L-arabitol, xylitol, ID-chiro-inositol, inositol, myoinositol, galactinol, L-quebrachitol, D-pinitol, D-ononitol, D-myo-inositol-1,3-diphosphate and galactinol.

2. The composition of claim 1, wherein the PPO inhibitor is selected from the group consisting of ethyl [3-[2-chloro-4-fluoro-5-(1-methyl-6-trifluoromethyl-2,4-dioxo-1,2,3,4-tetrahydropyrimidin-3-yl) phenoxy]-2-pyridyloxy]acetate, flumioxazin, lactofen, fomesafen, saflufenacil, sulfentrazone and trifludimoxazin.

3. The composition of claim 2, wherein the PPO inhibitor is ethyl [3-[2-chloro-4-fluoro-5-(1-methyl-6-trifluoromethyl-2,4-dioxo-1,2,3,4-tetrahydropyrimidin-3-yl) phenoxy]-2-pyridyloxy]acetate.

4. The composition of claim 1, wherein the one or more sugar alcohols is D-sorbitol.

5. The composition of claim 1, further comprising one or more auxin herbicides.

6. The composition of claim 5, wherein the one or more auxin herbicides is selected from the group consisting of dicamba, 2,4-D, dichloroprop, (4-chloro-2-methylphenoxy) acetic acid (MCPA), 4-(4-chloro-2 methylphenoxy) butanoic acid (MCPB), mecoprop, picloram, quinclorac, triclopyr, fluroxypyr, picloram, aminopyralid, clopyralid and aminocyclopyrachlor and agricultural acceptable salts and esters thereof.

7. The composition of claim 6, wherein the one or more auxin herbicides is a salt of dicamba.

8. The composition of claim 7, where in the salt of dicamba is selected from the group consisting of dicamba-biproamine, dicamba-diglycolamine, and dicamba-tetrabutylamine.

9. An agricultural composition comprising ethyl [3-[2-chloro-4-fluoro-5-(1-methyl-6-trifluoromethyl-2,4-dioxo-1,2,3,4-tetrahydropyrimidin-3-yl) phenoxy]-2-pyridyloxy]acetate and D-sorbitol, wherein presence of the D-sorbitol in the composition improves weed control by the PPO inhibitor by at least 10% over the PPO inhibitor alone.

10. The composition of claim 9, further comprising a salt of dicamba.

11. A method of controlling weeds comprising applying concurrently or sequentially a protoporphyrinogen oxidase (PPO) inhibitor and one or more sugar alcohols to the weeds or an area in need of weed control, wherein presence of the one or more sugar alcohols in the composition improves weed control by the PPO inhibitor by at least 10% over the PPO inhibitor alone, wherein the one or more sugar alcohols is selected from the group consisting of D-mannitol, D-sorbitol, maltitol, erythritol, L-arabitol, xylitol, ID-chiro-inositol, inositol, myoinositol, galactinol, L-quebrachitol, D-pinitol, D-ononitol, D-myo-inositol-1,3-diphosphate and galactinol.

12. The method of claim 11, further comprising applying concurrently or sequentially one or more auxin herbicides to the weeds or an area in need of weed control.

13. The method of claim 11, wherein the PPO inhibitor is applied at a rate from about 1 to about 100 grams per hectare.

14. The method of claim 11, wherein the PPO inhibitor is applied at a rate from about 10 to about 50 grams per hectare.

15. The method of claim 11, wherein the PPO inhibitor is applied at a rate of 20 grams per hectare.

16. The method of claim 11, wherein the one or more sugar alcohols is applied at a rate about 100 to about 100,000 grams per hectare.

17. The method of claim 11, wherein the one or more sugar alcohols is applied at a rate about 1,000 to about 30,000 grams per hectare.

18. The method of claim 11, wherein the one or more sugar alcohols is applied of about 6,800 grams per hectare.

19. The method of claim 12, wherein the one or more auxin herbicides is applied at a rate about 1 to about 1,000 grams per hectare.

* * * * *